No. 686,905. Patented Nov. 19, 1901.
R. B. PRICE.
RUBBER VEHICLE TIRE.
(Application filed Apr. 11, 1901.)
(No Model.)

Witnesses:
E. F. Wilson
John Snowhook

Inventor:
Raymond B. Price
By Rudolph —
Attorney

UNITED STATES PATENT OFFICE.

RAYMOND B. PRICE, OF CHICAGO, ILLINOIS.

RUBBER VEHICLE-TIRE.

SPECIFICATION forming part of Letters Patent No. 686,905, dated November 19, 1901.

Application filed April 11, 1901. Serial No. 55,337. (No model.)

*To all whom it may concern:*

Be it known that I, RAYMOND B. PRICE, a citizen of the United States, residing at Chicago, in the county of Cook and State of Illinois, have invented certain new and useful Improvements in Rubber Vehicle-Tires; and I do hereby declare the following to be a full, clear, and exact description of the invention, such as will enable others skilled in the art to which it appertains to make and use the same.

This invention relates to a novel construction of a rubber vehicle-tire, the object being to provide a simple and efficient device of this character; and it consists in the features of construction and combinations of parts hereinafter fully described and claimed.

Figure 1:
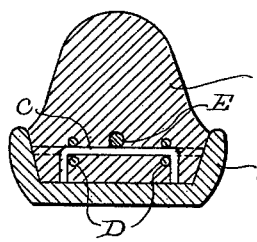
Figure 2:
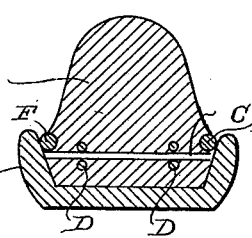
Figure 3:
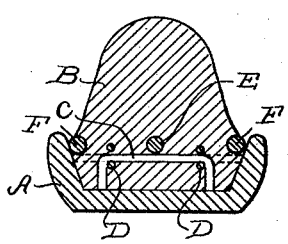
Figure 4:
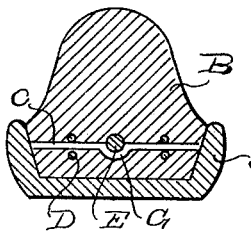
Figure 5:
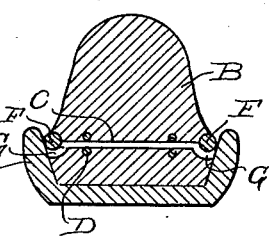
Figure 6:
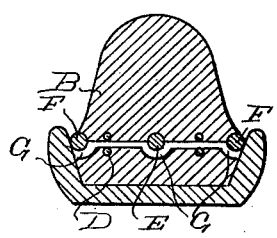

In the accompanying drawings, illustrating my invention, Figure 1 is a transverse section of a tire constructed in accordance with my invention. Figs. 2, 3, 4, 5, and 6 are transverse sections showing modified forms of construction.

This invention consists, essentially, in providing in a tire lateral stiffening devices which can be readily intermolded therein and which may simultaneously serve as a means for securing the tire within the rim in connection with longitudinal retaining wires or bands.

I am aware that the use of lateral wires in the base of a tire is not new, nor is the use of retaining-bands to bear upon lateral stiffening devices new.

My invention relates particularly to the use of a large number of practically parallel straight lateral wires which are bound together by a very few longitudinal wires so interwoven with or otherwise secured to said lateral wires as to serve to keep the latter spaced apart, but performing preferably no other function, thereby enabling said lateral wires to be definitely located within the tire and making said tire as light as possible consistent with efficient lateral stiffening.

In said drawings, A indicates the rim, and B the tire, which is provided in its base portion with intermolded practically straight parallel lateral wires C at regular intervals, which said wires are securely held in relative position by means of one or more strands of longitudinal wires D, secured to said lateral wires in any suitable manner, the said longitudinal strands being spaced farther apart than said lateral wires and serving only to retain said lateral wires in relative position. Said longitudinal strands are located inwardly from the ends of said lateral wires, so as to leave said ends free. The latter are bent downwardly at intervals, so as to rest upon the bottom of the mold, thereby determining the position of said lateral and longitudinal wires in the tire. Means, such as longitudinal openings E in the body of the tire or longitudinal recesses F in the sides of the tire, or both, may be provided to receive retaining wires or bands, which bear directly upon said lateral wires, thereby securing the tire within the rim. The wires or bands bearing directly upon the lateral wires are positively prevented from cutting down through the base of the tire and may be prevented from cutting laterally by bending said lateral wires to form recesses G, in which the retaining bands or wires lie. By means of so relatively securing the lateral wires together the entire structure may be made very much llighter than heretofore and its efficiency greatly increased, owing to the fact that the lateral wires cannot get out of place and each individual wire performs its function, thereby permitting the use of very much lighter material.

I claim as my invention—

1. In a vehicle-tire, the combination with the rim or channel, and a rubber tire provided with intermolded lateral wires in its base portion, said lateral wires being firmly secured in relative position by means of one or more longitudinal strands secured to each of said lateral wires between its ends, of longitudinal retaining wires or bands adapted to bear directly upon said lateral wires, substantially as described.

2. In a vehicle-tire, the combination with the rim or channel, and a rubber tire provided with intermolded lateral wires in its base portion, said lateral wires being firmly secured in relative position by means of one or more longitudinal strands secured to each of said lateral wires between its ends, the ends of said lateral wires being bent downwardly at intervals, of longitudinal retaining wires or bands adapted to bear directly upon said lateral wires.

3. In a vehicle-tire, the combination with the rim or channel, and a rubber tire provided with intermolded lateral wires in its base portion, said lateral wires being firmly secured in relative position by means of one or more longitudinal strands secured to each of said lateral wires between its ends, said lateral wires being bent downwardly at intervals, said lateral wires being bent to form depressions therein, of longitudinal retaining wires or bands adapted to bear directly upon said lateral wires and to lie in said depressions.

In testimony whereof I affix my signature in presence of two witnesses.

RAYMOND B. PRICE.

Witnesses:
 RUDOLPH WM. LOTZ,
 E. F. WILSON.